United States Patent
Wei et al.

(10) Patent No.: US 9,419,433 B2
(45) Date of Patent: Aug. 16, 2016

(54) POWER SUPPLY APPARATUS RELATING TO DC-DC VOLTAGE CONVERSION AND HAVING SHORT PROTECTION FUNCTION

(71) Applicant: FSP TECHNOLOGY INC., Taoyuan County (TW)

(72) Inventors: Lung-Chi Wei, Taoyuan County (TW); Ching-Chia Chu, Taoyuan County (TW)

(73) Assignee: FSP TECHNOLOGY INC., Taoyuan (TW)

( * ) Notice: Subject to any disclaimer, the term of this patent is extended or adjusted under 35 U.S.C. 154(b) by 431 days.

(21) Appl. No.: 14/049,208

(22) Filed: Oct. 8, 2013

(65) Prior Publication Data

US 2014/0098452 A1    Apr. 10, 2014

Related U.S. Application Data

(60) Provisional application No. 61/711,223, filed on Oct. 9, 2012.

(30) Foreign Application Priority Data

Aug. 19, 2013    (TW) ................................ 102129668 A

(51) Int. Cl.
     *H02H 7/00*      (2006.01)
     *H02H 9/02*      (2006.01)
     *H02H 9/00*      (2006.01)

(52) U.S. Cl.
     CPC ........ *H02H 9/02* (2013.01); *H02H 9/001* (2013.01)

(58) Field of Classification Search
     CPC ........................................................ H02H 9/02
     USPC ......................................................... 361/93.9
     See application file for complete search history.

(56) References Cited

U.S. PATENT DOCUMENTS 7,541,795 B1 *   6/2009   Smith et al. ............. H02M 1/32
                                                               323/283
9,155,137 B2 *   10/2015   Yang et al. ......... H05B 33/0809

* cited by examiner

*Primary Examiner* — Stephen W Jackson
(74) *Attorney, Agent, or Firm* — Jianq Chyun IP Office

(57) ABSTRACT

A power supply apparatus is provided, and which includes a power conversion circuit, a control chip with soft-start function and a short protection circuit. The power conversion circuit is configured to provide a DC output voltage to a load in response to an output pulse-width-modulation (PWM) signal. The control chip is operated under a DC input voltage, and configured to generate the output PWM signal to control the operation of the power conversion circuit. The short protection circuit is configured to pull-down the level of a soft-start pin of the control chip, so as to substantially/significantly reduce the frequency and duty cycle of the output PWM signal, and then substantially/significantly reduce the current flowing through the shorted load.

13 Claims, 3 Drawing Sheets

POWER SUPPLY APPARATUS RELATING TO DC-DC VOLTAGE CONVERSION AND HAVING SHORT PROTECTION FUNCTION

CROSS-REFERENCE TO RELATED APPLICATION

This application claims the priority benefits of U.S. provisional application Ser. No. 61/711,223, filed on Oct. 9, 2012 and Taiwan application serial no. 102129668, filed on Aug. 19, 2013. The entirety of each of the above-mentioned patent applications is hereby incorporated by reference herein and made a part of this specification.

BACKGROUND OF THE INVENTION

1. Field of the Invention

The present invention relates to a power conversion technology, and more particularly, to a power supply apparatus associated with a DC-DC voltage conversion and having a short protection function.

2. Description of the Related Art

When a traditional DC-DC converter adopting a PWM-based control mechanism encounters an output terminal (load) short-circuit, if there is no additional short-circuit protection being applied, then the DC-DC converter would continuously generate/output an abnormal large current for flowing through the shorted load. As a result, an unusual increase to the temperature of the DC-DC converter itself or the components within the load may occur, thereby increasing a risk of damaging the DC-DC converter itself or the components within the load.

SUMMARY OF THE INVENTION

In order to resolve the above-mentioned problems, an exemplary embodiment of the invention provides a power supply apparatus including a power conversion circuit, a control chip with soft-start function and a short protection circuit. The power conversion circuit is configured to provide a DC output voltage to a load in response to an output pulse-width-modulation (PWM) signal. The control chip with soft-start function is coupled to the power conversion circuit. The control chip is operated under a DC input voltage, and configured to generate the output PWM signal to control the operation of the power conversion circuit. The short protection circuit is coupled to the control chip, and configured to pull-down the level of a soft-start pin of the control chip in response to a short-circuit of the load, so as to substantially/significantly reduce the frequency and duty cycle of the output PWM signal, and then substantially/significantly reduce the current flowing through the shorted load.

In an exemplary embodiment of the invention, the control chip may further include an output pin is configured to output the generated output PWM signal. Under this condition, the short protection circuit may include: a PNP-type bipolar junction transistor (BJT), a first and a second capacitor, and a first and a second resistor. An emitter of the PNP-type BJT is coupled to the soft-start pin of the control chip, and a collector of the PNP-type BJT is coupled to a ground potential. A first end of the first capacitor is configured to receive the DC input voltage, and a second end of the first capacitor is couple to the base of the PNP-type BJT. A first end of the first resistor is coupled to the base of the PNP-type BJT, and a second end of the first resistor is coupled to the ground potential. The second capacitor is connected in parallel to the first resistor. A first end of the second resistor is coupled to the base of the PNP-type BJT, and a second end of the second resistor is coupled to the output pin of the control chip.

In an exemplary embodiment of the invention, the short protection circuit may further include: a third capacitor connected across the emitter and the collector of the PNP-type BJT.

In an exemplary embodiment of the invention, under a condition that the short protection circuit includes the PNP-type BJT, the first to the third capacitors, and the first and the second resistors, the short protection circuit may further include: a diode and a third resistor. Accordingly, 1) an anode of the diode may be coupled to the output pin of the control chip, a cathode of the diode may be coupled to the second end of the second resistor, a first end of the third resistor may be coupled to the second end of the first capacitor, and a second end of the third resistor may be coupled to the base of the PNP-type BJT. Alternatively, 2) the first end of the third resistor may be coupled to the base of the PNP-type BJT, the anode of the diode may be coupled to the second end of the third resistor, and the cathode of the diode may be coupled to the output pin of the control chip.

In an exemplary embodiment of the invention, the control chip may further have a power pin configured to receive the DC input voltage required for operation; and the control chip may further have a ground pin coupled to the ground potential.

In an exemplary embodiment of the invention, the power supply apparatus may further include: a bypass capacitor coupled between the power pin and the ground pin of the control chip, and configured to reduce a power noise inputted into the control chip.

In an exemplary embodiment of the invention, the control chip may further have a bootstrap pin. Under the this condition, the power supply apparatus may further include: a bootstrap capacitor coupled between the bootstrap pin and the output pin of the control chip, and configured to enhance a driving voltage of a high-side N-type transistor coupled between the power pin and the output pin within the control chip.

In an exemplary embodiment of the invention, the control chip may further have a chip enable pin. Under this condition, the power supply apparatus may further include: a pull-up resistor coupled between the power pin and the chip enable pin of the control chip, and configured to activate the control chip.

In an exemplary embodiment of the invention, the control chip may further have a compensation pin. Under this condition, the power supply apparatus may further include: an RC network coupled between the compensation pin of the control chip and the ground potential, and configured to compensate a system frequency response of the power supply apparatus, so as to stabilize the operation of the power supply apparatus.

In an exemplary embodiment of the invention, the control chip may further have a feedback pin. Under this condition, the power supply apparatus may further include: an output feedback circuit coupled between the DC output voltage and the ground potential, and configured to provide a feedback voltage associated with the DC output voltage to the feedback pin of the control chip, so as to make the control chip to adjust the generated output PWM signal, and then regulate and stabilize the DC output voltage provided by the power conversion circuit.

In an exemplary embodiment of the invention, the power supply apparatus may further include: a setting capacitor coupled between the soft-start pin and the ground pin of the control chip, and configured to set a soft start time for the power supply apparatus.

In an exemplary embodiment of the invention, a topology of the power conversion circuit at least includes a buck power conversion topology, a boost power conversion topology, a boost-buck power conversion topology, a flyback power conversion topology, a forward power conversion topology or a combination thereof.

In view of the foregoing, the invention provides the power supply apparatus associated with the DC-DC voltage conversion and having the short protection function. When the load is short-circuited, based on the configuration of the short protection circuit, the level of the soft-start pin of the control chip is to be pulled-down to the ground. Under this condition, the frequency and duty cycle of the output PWM signal generated by the control chip are substantially/significantly reduced, so that the current flowing through the shorted load is substantially/significantly reduced, thereby substantially/significantly reducing a temperature of, and the risk of damage to, the power supply apparatus itself or the components within the load when the load is short-circuited.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1:
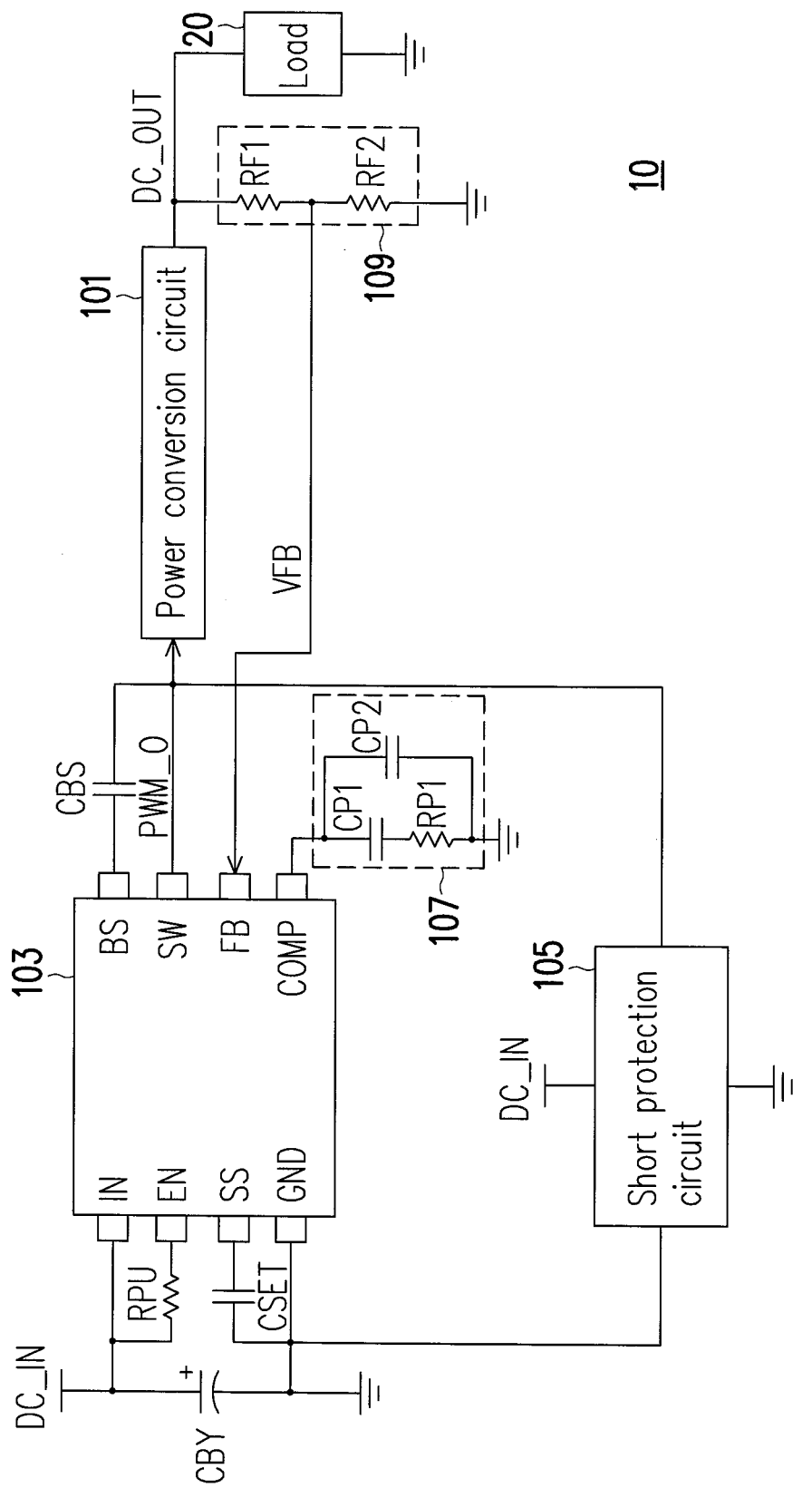
FIG. 1 is a schematic diagram illustrating a power supply apparatus 10 according to an exemplary embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a schematic diagram illustrating a power supply apparatus 10 according to an exemplary embodiment of the invention. Referring to FIG. 1, the configuration of the power supply apparatus 10 may be a DC voltage conversion configuration, and the power supply apparatus 10 has a short protection function.

In the present exemplary embodiment, the power supply apparatus 10 includes: a power conversion circuit 101, a control chip 103 with soft-start function, a short protection circuit 105, an RC network 107, an output feedback circuit 109, a bypass capacitor CBY, a bootstrap capacitor CBS, a pull-up resistor RPU, and a setting capacitor CSET.

The power conversion circuit 101 is configured to provide a DC output voltage DC_OUT to a load (e.g., an electronic device, but not limited thereto) 20 in response to an output pulse-width-modulation (PWM) signal PWM_O from the control chip 103. In the present exemplary embodiment, a topology of the power conversion circuit 101 may be considered as a buck power conversion topology, a boost power conversion topology, a boost-buck power conversion topology, a flyback power conversion topology, a forward power conversion topology or a combination thereof according to actual design/application requirements, but not limited thereto.

The control chip with soft-start function 103 may have a plurality of pins, such as: a power pin IN, a ground pin GND, a chip enable pin EN, a soft-start pin SS, a bootstrap pin BS, an output pin SW, a feedback pin FB, and a compensation pin COMP. Certainly, based on the actual design/application requirements, the control chip 103 may be additionally configured with other functional pins (e.g., an over-voltage detection pin, an over-current detection pin and so forth, but not limited thereto), or may cancel the existing functional pins of the control chip 103.

Basically, in order to enable/make the control chip 103 to operate normally, the control chip 103 receives the DC input voltage DC_IN required for the operation thereof through the power pin VDD, and is coupled to the ground potential (0V) through the ground pin GND. In other words, the control chip 103 is operated under the DC input voltage DC_IN. As a result, a voltage regulator (not shown) configured within the control chip 103 may regulate the received DC input voltage DC_IN (such as boosting or bucking), so as to generate/obtain a working voltage for each internal functional circuit within the control chip 103.

Moreover, the bypass capacitor CBY is coupled between the power pin IN and the ground pin GND of the control chip 103, and configured to reduce a power noise inputted into the control chip 103, so as to stabilize the operation of the control chip 103. Certainly, the inclusion bypass capacitor CBY may be selective/optional.

Furthermore, in order to activate the control chip 103, the pull-up resistor RPU may be coupled between the power pin IN and the chip enable pin EN of the control chip 103. The pull-up resistor RPU is configured to activate the control chip 103. In other words, if a signal constantly maintained at high level is inputted into the chip enable pin EN of the control chip 103, then the control chip 103 may be activated, so as to make the control chip 103 to be in an operational state; contrarily, if a signal constantly maintained at low level is inputted into the chip enable pin EN of the control chip 103, then the control chip 103 may be shutdown, so as to make the control chip 103 to be in an off/standby state.

In the present exemplary embodiment, the control chip 103 is coupled to the power conversion circuit 101, and configured to generate the output PWM signal PWM_O, and output the generated output PWM signal PWM_O through output pin SW so as to control the operation of the power conversion circuit 101. It is worth mentioning that, under the normal operational condition of the power supply apparatus 10, a duty cycle of the output PWM signal PWM_O generated by the control chip 103 may be maintained at about 70.4%, and a frequency of the output PWM signal PWM_O generated by the control chip 103 may be maintained at about 370 KHz, but not limited thereto.

Figure 2:
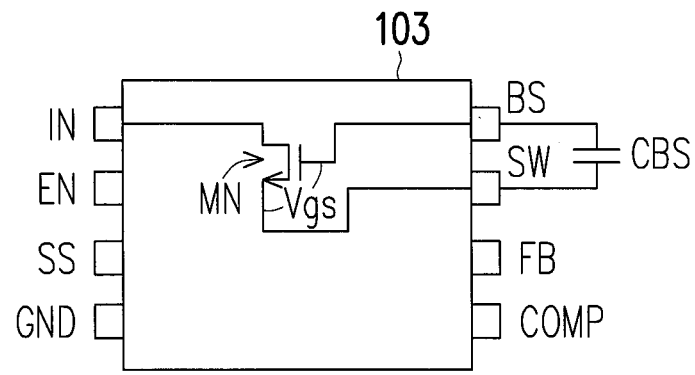
FIG. 2 is a schematic diagram illustrating the purpose of use for a bootstrap capacitor CBS depicted in FIG. 1.

In addition, in order to make a high level of the output PWM signal PWM_O to approach/be close to the DC input voltage DC_IN by as much as possible, the bootstrap capacitor CBS may be coupled between the bootstrap pin BS and the output pin SW of the control chip 103. The bootstrap capacitor CBS is configured to enhance a driving voltage (viz., a gate-source voltage Vgs) of a high-side N-type transistor (as shown in FIG. 2) MN coupled between the power pin IN and the output pin SW within the control chip 103. In other words, the purpose of disposing the bootstrap capacitor CBS between the bootstrap pin BS and the output pin SW of the control chip 103 is to facilitate the control chip 103 in generating the output PWM signal PWM_O.

Moreover, in order to stabilize the operation of the power supply apparatus 10, the RC network 107 may be coupled between the compensation pin COMP and the ground potential (0V) of the control chip 103. The RC network 107 is configured to compensate the system frequency response of the power supply apparatus 10. In the present exemplary embodiment, the RC network 107 may be constituted of compensation capacitors (CP1, CP2) and a compensation resistor RP1. The compensation capacitor CP1 and the compensation resistor RP1 are serially connected between the compensation pin COMP of the control chip 103 and the ground potential (0V), and then the compensation capacitor CP2 is connected in parallel to the serially connected capacitor-resistor (CP1, RP1). It is to be noted that, the inclusion of the compensation capacitor CP2, may be selective/optional.

Furthermore, in order to stabilize the DC output voltage DC_OUT provided by the power conversion circuit 101, the output feedback circuit 109 may be coupled between the DC output voltage DC_OUT and the ground potential (0V). The output feedback circuit 109 is configured to provide a feedback voltage VFB associated with the DC output voltage DC_OUT to the feedback pin FB of the control chip 103, so as to make the control chip 103 to accordingly adjust the output PWM signal PWM_O (such as: to adjust the duty cycle of the output PWM signal PWM_O), and then regulate and stabilize the DC output voltage DC_OUT provided by the power conversion circuit 101. In the present exemplary embodiment, the output feedback circuit 109 may be constituted of feedback resistors (RF1, RF2) serially connected between the DC output voltage DC_OUT and the ground potential (0V), but not limited thereto. Under this condition, the feedback voltage VFB may be considered as a voltage-dividing signal of the DC output voltage DC_OUT, which is namely: VFB=DC_OUT*(RF2/(RF1+RF2)).

In addition, since the control chip 103 contains a soft-start function for preventing an impact from being generated to the circuit of the backstage load 20, under this condition, the setting capacitor CSET may be coupled between the soft-start pin SS and the ground pin GND of the control chip 103. The setting capacitor CSET is configured to set a soft start time (namely, a process of gradually rising the DC output voltage DC_OUT from 0V to a rated voltage) of the power supply apparatus 10. It is worth mentioning that, the soft start time of the power supply apparatus 10 may correspondingly be determined by merely changing a capacitance value of the setting capacitor CSET; however, if the soft-start function of the control chip 103 is not activated, then the soft-start pin SS of the control chip 103 may be floated. Moreover, in terms of configuration, the capacitance value of the setting capacitor CSET must be lower than a predetermined upper-limit time set for the control chip 103 to complete the soft-start function.

Referring back to the contents recited in the "Description of the Related Art", when the traditional DC-DC converter that adopts the PWM-based control mechanism encounters an output terminal (load) short-circuit, if there is no additional short-circuit protection being applied, then the DC-DC converter would continuously generate/output an abnormal large current for flowing through the shorted load. As a result, an unusual increase to the temperature of the DC-DC converter itself or the components within the load may occur, thereby increasing a risk of damaging the DC-DC converter itself or the components within the load.

In order to resolve the above-mentioned problems, the present exemplary embodiment is to substantially/significantly reduce the temperature of and the risk of damaging the power supply apparatus 10 itself or the components within the load 20 via the short protection circuit 105 when the load 20 is short-circuited. More specifically, the short protection circuit 105 is coupled to the control chip 103, and configured to pull-down a level of the soft-start pin SS of the control chip 103 (such as to pull-down to the ground, but not limited thereto) in response to the shorted load 20, so as to substantially/significantly reduce the frequency and duty cycle of the output PWM signal PWM_O, and then to substantially/significantly reduce a current flowing through the shorted load 20.

Figure 3:
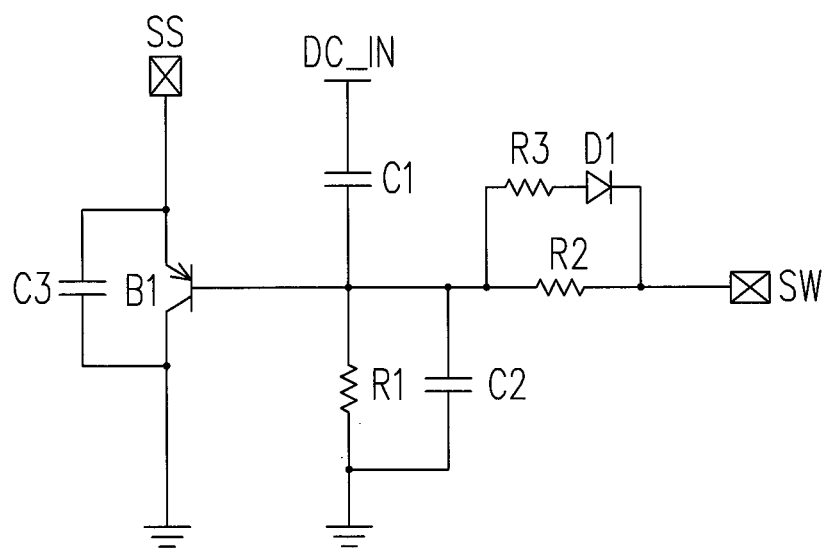
FIG. 3 is a schematic diagram illustrating an implementation of a short protection circuit 105 according to an exemplary embodiment of the invention.

As shown in FIG. 3, FIG. 3 is a schematic diagram illustrating an implementation of the short protection circuit 105 according to an exemplary embodiment of the invention. Referring to FIG. 1 in conjunction with FIG. 3, the short protection circuit 105 includes: a PNP-type bipolar junction transistor (BJT) B1, capacitors C1-C3, resistors R1-R3, and a diode D1.

In the present exemplary embodiment, an emitter of the PNP-type BJT B1 is coupled to the soft-start pin SS of the control chip 103, and a collector of the PNP-type BJT B1 is coupled to the ground potential (0V). A first end of the capacitor C1 is configured to receive the DC input voltage DC_IN, and a second end of the capacitor C1 is coupled to a base of the PNP-type BJT B1. A first end of the resistor R1 is coupled to the base of the PNP-type BJT B1, and a second end of the resistor R1 is coupled to the ground potential (0V). The capacitor C2 is connected in parallel to the resistor R1. A first end of the resistor R2 is coupled to the base of the PNP-type BJT B1, and a second end of the resistor R2 is coupled to the output pin SW of the control chip 103.

The capacitor C3 is connected across the emitter and the collector of the PNP-type BJT B1. It is worth mentioning that, the inclusion of the capacitor C3 may be selective/optional. A first end of the resistor R3 is coupled to the base of the PNP-type BJT B1, an anode of the diode D1 is coupled to a second end of the resistor R3, and a cathode of the diode D1 is coupled to the output pin SW of the control chip 103.

From the above, under the normal operational condition of the power supply apparatus 10 (e.g., the load 20 is not short-circuited), the control chip 103 may generate an output PWM signal PWM_O with a duty cycle of about 70.4% and a frequency of about 370 KHz for controlling the operation of the power conversion circuit 101, so as to make the power conversion circuit 101 to stably provide the DC output voltage DC_OUT to the load 20. Meanwhile, the current flowing through the load 20 (viz., the output current of the power supply apparatus 10), for example, may be a pre-designed output current (e.g., 1.8 A, but not limited thereto). Under this condition, since the power supply apparatus 10 is under the normal operational condition (viz., the load 20 is not short-circuited), the level of the soft-start pin SS of the control chip 103 is about 1.5~2.0V (but not limited thereto), and a cross voltage of the resistor R1 or the capacitor C2 is about 3~4V. Therefore, the PNP-type BJT B1 is in a turn-off state. In other words, under the normal operational condition of the power supply apparatus 10 (viz., the load 20 is not short-circuited), the short protection circuit 105 is in an inactivated state.

On the other hand, once the load 20 encounters short-circuit, the level of the output pin SW of the control chip 103 is substantially/significantly reduced, so that the cross voltage of the resistor R1 or the capacitor C2 is also substantially/significantly reduced. Meanwhile, the PNP-type BJT B1 within the short protection circuit 105 is transiently turned-on in response to the shorted load 20 (viz., the short protection circuit 105 is in an activated state when the load 20 is short-circuited), so as to pull-down the level of the soft-start pin SS of the control chip 103 to the ground. Under this condition, according to the characteristics of the control chip 103, the frequency and duty cycle of the output PWM signal PWM_O generated by the control chip 103 is substantially/significantly reduced (e.g., the duty cycle is reduced from the original 70.4% to 3.5%, and the frequency is reduced from the original 370 KHz to 44 KHz, but not limited thereto), and then the current flowing through the shorted load 20 is also substantially/significantly reduced (e.g., 0.8~0.94 A, but not limited thereto). As compared to a condition without the short protection circuit 105, the power supply apparatus 10 may continuously output a shorted current of about 4.64 A. Apparently, the power supply apparatus 10 configured with the short protection circuit 105 may substantially/significantly reduce the temperature of and the risk of damaging the power supply apparatus 10 itself or the components within the load 20 when the load 20 is short-circuited.

In the actual practice or application, if the power supply topology of the power conversion circuit 101 is the buck power conversion topology, then the DC input voltage DC_IN may be assumed to be 18V, and the DC output voltage DC_OUT may be assumed to be 12V. Under this condition, in the short protection circuit 105 depicted by FIG. 3, a capacitance value of the capacitor C1 may be selected as 104PF, a capacitance value of the capacitor C2 may be selected as 474PF, a capacitance value of the capacitor C3 may be selected as 473PF, a resistance value of the resistor R1 may be selected as 150 KΩ, a resistance value of the resistor R2 may be selected as 270 KΩ, a resistance value of the resistor R3 may be selected as 91KΩ, and the diode D1 may be selected as a diode element of Number IN4148. Certainly, in the short protection circuit 105 depicted by FIG. 3, the capacitance values of capacitors C1-C3 and the resistance value of the resistors R1-R3 may be adjusted according to the actual design/application requirements. Moreover, based on other types of power conversion topologies differ from the buck power supply topology, in the short protection circuit 105 depicted by FIG. 3, the capacitance values of the capacitors C1-C3 and the resistance values of the resistors R1-R3 may also be adjusted according to the actual design/application requirements.

Figure 4:
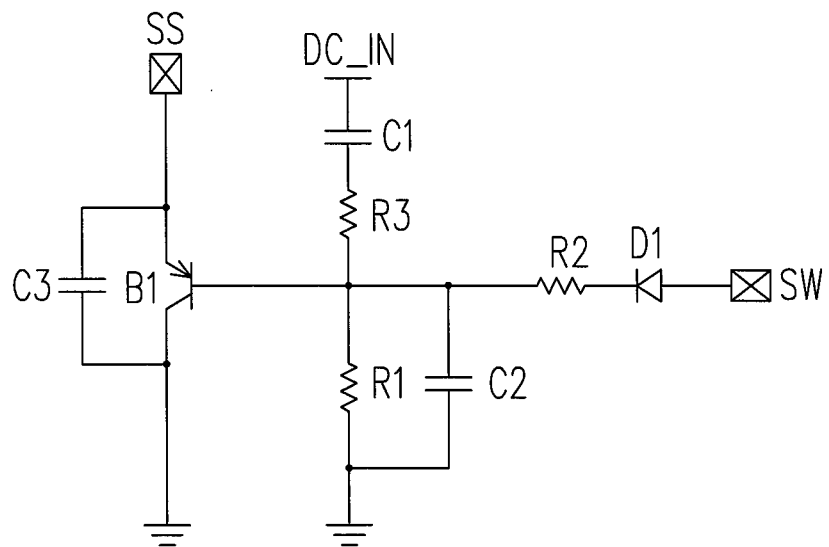
FIG. 4 is a schematic diagram illustrating another implementation of the short protection circuit 105 according to another exemplary embodiment of the invention.

It is worth mentioning that, the implementation of the short protection circuit 105 configured/applied within the power supply apparatus 10 of the invention is not limited to the implementation depicted by FIG. 3. To be more specific, FIG. 4 is a schematic diagram illustrating another implementation of the short protection circuit 105 according to another exemplary embodiment of the invention. Referring to FIG. 3 in conjunction with FIG. 4, the implementation of the short protection circuit 105 depicted by FIG. 4 is different that depicted by FIG. 3 in merely that: 1) the anode of the diode D1 is changed to as being coupled to the output pin SW of the control chip 103; 2) the cathode of the diode D1 is changed to as being coupled to the second end of the resistor R2; and 3) the resistor R3 is changed to as being coupled between the second end of the capacitor C1 and the base of the PNP-type BJT B1. However, the short protection circuit 105 depicted by FIG. 4 may achieve a technical efficiency similar to that of the short protection circuit 105 depicted by FIG. 3.

In the actual practice or application, if the power supply topology of the power conversion circuit 101 is the buck power conversion topology, then the DC input voltage DC_IN may be assumed to be 18V, and the DC output voltage DC_OUT may be assumed to be 12V. Under this condition, in the short protection circuit 105 depicted by FIG. 4, the capacitance value of the capacitor C1 may be selected as 105PF, the capacitance value of the capacitor C2 may be selected as 474PF, the capacitance value of the capacitor C3 may be selected as 473PF, the resistance value of the resistor R1 may be selected as 330 KΩ, the resistance value of the resistor R2 may be selected as 1 MΩ, the resistance value of the resistor R3 may be selected as 330 KΩ, and the diode D1 may be selected as a diode element of Number IN4148. Similarly, in the short protection circuit 105 depicted by FIG. 4, the capacitance values of the capacitors C1-C3 and the resistance values of the resistors R1-R3 may be adjusted according to the actual design/application requirements. Moreover, based on the other types of power conversion topology differ from the buck power supply topology, in the short protection circuit 105 depicted by FIG. 4, the capacitance values of the capacitors C1-C3 and the resistance values of the resistors R1-R3 may also be adjusted according to the actual design/application requirements.

Figure 5:
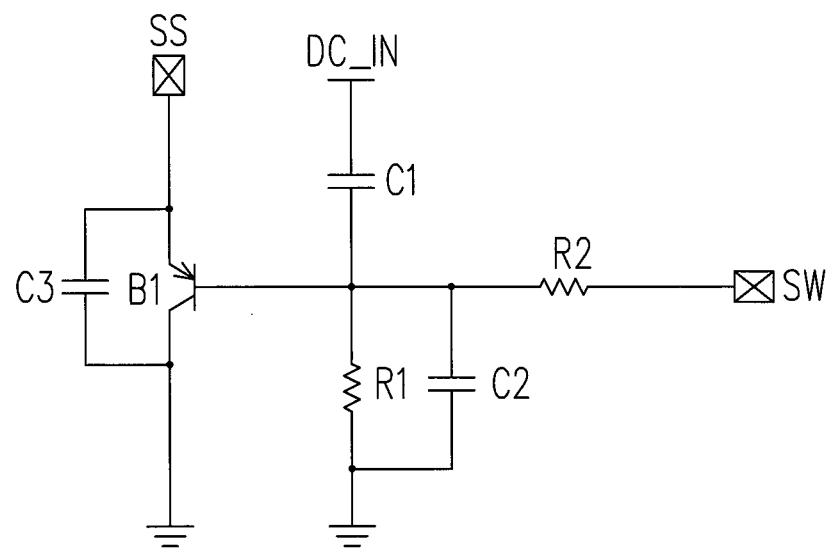
FIG. 5 is a schematic diagram illustrating yet another implementation of the short protection circuit 105 according to yet another exemplary embodiment of the invention.

In addition, FIG. 5 is a schematic diagram illustrating yet another implementation of the short protection circuit 105 according to yet another exemplary embodiment of the invention. Referring to FIG. 4 in conjunction with FIG. 5, the implementation of the short protection circuit 105 depicted by FIG. 5 is different from that depicted by FIG. 4 in merely that: the resistor R3 and the diode D1 are omitted. In other words, in the short protection circuit 105 depicted by FIG. 5, the second end of the capacitor C1 is changed to as being coupled to the base of the PNP-type BJT B1, and the second end of the resistor R2 is changed to as being coupled to the output pin SW of the control chip 103. However, the short protection circuit 105 depicted by FIG. 5 may achieve a technical efficiency similar to that of the short protection circuit 105 depicted by FIG. 4.

In the actual practice or application, if the power supply topology of the power conversion circuit 101 the buck power conversion topology, then the DC input voltage DC_IN may be assumed to be 18V, and the DC output voltage DC_OUT may be assumed to be 12V. Under this condition, in the short protection circuit 105 depicted by FIG. 5, the capacitance value of the capacitor C1 may be selected as 104PF, the capacitance value of the capacitor C2 may be selected as 474PF, the capacitance value of the capacitor C3 may be selected as 473PF, the resistance value of the resistor R1 may be selected as 330 KΩ, and the resistance value of the resistor R2 may be selected as 1 MΩ. Similarly, in the short protection circuit 105 depicted by FIG. 5, the capacitance values of the capacitors C1-C3 and the resistance values of the resistors (R1, R2) may be adjusted according to the actual design/application requirements. Moreover, based on the other types of power conversion topology differ from the buck power supply topology, in the short protection circuit 105 depicted by FIG. 5, the capacitance values of the capacitors C1-C3 and the resistance values of the resistors (R1, R2) may also be adjusted according to the actual design/application requirements.

It is worth mentioning that, in the short protection circuit 105 depicted by FIG. 5, the reason for omitting the resistor R3 shown in FIG. 4 and changing the capacitance value of the capacitor C1 shown in FIGS. 4 to 104P is to enhance the time set for the control chip 103 to complete the soft-start function; in addition, the reason for omitting the diode D1 shown in FIG. 4 is to reduce the cross voltage of the resistor R1 when the load 20 is short-circuited, so as to reduce the duty cycle of the output PWM signal PWM_O generated by the control chip 103, and then reduce the shorted current outputted by the power supply apparatus 10 when the load 20 is short-circuited.

Moreover, a selection principle for capacitance values of the capacitors C1 and C2 in FIG. 3 to FIG. 5 is: to obtain an acceptable balance between the cross voltage of the resistor R1 and the time set for the control chip 103 to complete the soft-start function when the load 20 is short-circuited. In other words, when the load 20 is short-circuited, it is deemed acceptable as long as the cross voltage of the resistor R1 does not over-shoot, and the control chip 103 can complete the soft-start function within the predetermined upper-limit time.

Furthermore, the short protection circuit 105 depicted by FIG. 3 to FIG. 5 is particularly suitable for being applied to a control chip with a non-latch type output and having the soft-start function. Herein, the so-called "non-latch type output" indicates that: when the load is short-circuited, the control chip is continuously generating an output PWM signal having a particular duty cycle and frequency.

Even though the above-mentioned exemplary embodiment has taken the example of reducing the duty cycle of the output PWM signal PWM_O by pulling-down the level of the soft-start pin SS of the control chip 103 for the purpose of descriptions, but the invention is not limited thereto. More specifically, other functional pins of the control chip 103 that have similar characteristics (viz., reducing the duty cycle of the output PWM signal PWM_O by pulling-down the pin level) as the soft-start pin SS may all be applied, depending on the actual design/application requirements.

In summary, the invention provides the power supply apparatus 10 associated with the DC-DC voltage conversion and having the short protection function. When the load 20 is short-circuited, based on the configuration of the short protection circuit 105, the level of the soft-start pin SS of the control chip 103 is pulled-down to the ground. Under this condition, the frequency and duty cycle of the output PWM signal PWM_O generated by the control chip 103 is substantially/significantly reduced, and then the current flowing through the shorted load 20 is also substantially/significantly reduced, thereby substantially/significantly reducing the temperature of and the risk of damaging the power supply apparatus 10 itself and the components within the load 20 when the load 20 is short-circuited.

It will be apparent to those skills in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A power supply apparatus comprising:
   a power conversion circuit configured to provide a DC output voltage to a load in response to an output pulse-width-modulation signal;
   a control chip with soft-start function and coupled to the power conversion circuit, the control chip being operated under a DC input voltage, and configured to generate the output pulse-width-modulation signal to control an operation of the power conversion circuit; and
   a short protection circuit comprising a hardware switch coupled to a soft-start pin of the control chip, wherein the short protection circuit is configured to: pull-down a level of the soft-start pin of the control chip through the hardware switch in response to a short-circuit of the load, so as to substantially reduce a frequency and a duty cycle of the output pulse-width-modulation signal, and then substantially reduce a current flowing through the shorted load.

2. The power supply apparatus as recited in claim 1, wherein the control chip further has an output pin configured to output the generated output pulse-width-modulation signal, and the short protection circuit comprises:
   a PNP-type bipolar junction transistor having an emitter coupled to the soft-start pin and a collector coupled to a ground potential, wherein the PNP-type bipolar junction transistor serves as the hardware switch;
   a first capacitor having a first end configured to receive the DC input voltage and a second end coupled to a base of the PNP-type bipolar junction transistor;
   a first resistor having a first end coupled to the base of the PNP-type bipolar junction transistor and a second end coupled to the ground potential;
   a second capacitor connected in parallel to the first resistor; and
   a second resistor having a first end coupled to the base of the PNP-type bipolar junction transistor and a second end coupled to the output pin.

3. The power supply apparatus as recited in claim 2, wherein the short protection circuit further comprises:
   a third capacitor connected across the emitter and the collector of the PNP-type bipolar junction transistor.

4. The power supply apparatus as recited in claim 3, wherein the short protection circuit further comprises:
   a diode having an anode coupled to the output pin and a cathode coupled to the second end of the second resistor; and
   a third resistor having a first end coupled to the second end of the first capacitor and a second end coupled to the base of the PNP-type bipolar junction transistor.

5. The power supply apparatus as recited in claim 3, wherein the short protection circuit further comprises:
   a third resistor having a first end coupled to the base of the PNP-type bipolar junction transistor; and
   a diode having an anode coupled to the second end of the third resistor and a cathode coupled to the output pin.

6. The power supply apparatus as recited in claim 2, wherein:
   the control chip further has a power pin configured to receive the DC input voltage required for operation; and
   the control chip further has a ground pin coupled to the ground potential.

7. The power supply apparatus as recited in claim 6 further comprising:
   a bypass capacitor coupled between the power pin and the ground pin, and configured to reduce a power noise inputted into the control chip.

8. The power supply apparatus as recited in claim 6, wherein the control chip further has a bootstrap pin, and the power supply apparatus further comprises:
   a bootstrap capacitor coupled between the bootstrap pin and the output pin, and configured to enhance a driving voltage of a high-side N-type transistor coupled between the power pin and the output pin within the control chip.

9. The power supply apparatus as recited in claim 6, wherein the control chip further has a chip enable pin, and the power supply apparatus further comprises:
   a pull-up resistor coupled between the power pin and the chip enable pin, and configured to activate the control chip.

10. The power supply apparatus as recited in claim 6, wherein the control chip further has a compensation pin, and the power supply apparatus further comprises:

> an RC network coupled between the compensation pin and the ground potential, and configured to compensate a system frequency response of the power supply apparatus, so as to stabilize the operation of the power supply apparatus.

11. The power supply apparatus as recited in claim 6, wherein the control chip further has a feedback pin, and the power supply apparatus further comprises:

> an output feedback circuit coupled between the DC output voltage and the round potential, and configured to provide a feedback voltage associated with the DC output voltage to the feedback pin, so as to make the control chip to adjust the output pulse-width-modulation signal, and then regulate and stabilize the DC output voltage provided by the power conversion circuit.

12. The power supply apparatus as recited in claim 6 further comprising:

> a setting capacitor coupled between the soft-start pin and the ground pin, and configured to set a soft start time for the power supply apparatus.

13. The power supply apparatus as recited in claim 1, wherein a topology of the power conversion circuit at least comprises a buck power conversion topology, a boost power conversion topology, a boost-buck power conversion topology, a flyback power conversion topology, a forward power conversion topology or a combination thereof.

* * * * *